United States Patent [19]

Wilhelm

[11] Patent Number: 5,003,288

[45] Date of Patent: Mar. 26, 1991

[54] AMBIENT LIGHT SENSING METHOD AND APPARATUS

[75] Inventor: Daniel D. Wilhelm, Reed City, Mich.

[73] Assignee: Nartron Corporation, Reed City, Mich.

[21] Appl. No.: 262,494

[22] Filed: Oct. 25, 1988

[51] Int. Cl.$^5$ .............................................. B60Q 1/00
[52] U.S. Cl. .................................. 340/457.2; 340/468
[58] Field of Search ................. 340/457.2, 457, 468, 340/469

[56] References Cited

U.S. PATENT DOCUMENTS 3,662,334  5/1972  Susslin .......................... 340/457.2
4,125,824  11/1978 McPherson et al. .............. 340/457.2

FOREIGN PATENT DOCUMENTS 2705574  8/1978  Fed. Rep. of Germany ... 340/52 D
1557573  12/1979 United Kingdom ............. 340/457.2

OTHER PUBLICATIONS

Martin, "A Warning Device for Switching on the Lights of a Vehicle", *Rev. Espanola Electronica* (Spain) vol. 24, No. 272 (07.1977) pp. 46–47.

Wagstaff, "Dual Purpose Lights Reminder for Cars Reminds You to Turn Your Lights on Reminds You to Turn Your Lights Off", *Practical Elect.* vol. 15, No. 3 (03-1979) pp. 62–64.

*Primary Examiner*—Kenneth Wieder
*Assistant Examiner*—Robert W. Mueller
*Attorney, Agent, or Firm*—Watts Hoffmann Fisher & Heinke

[57] ABSTRACT

A telltale for sensing and responding to ambient light levels. A photosensor monitors light levels and causes a bulb or other controlled element to be energized if ambient levels reach a threshold. In one embodiment a time delay is instituted between sensing the threshold light level and bulb energization. This prevents false triggering on transitory conditions. An additional embodiment has a threshold level that uses hysteresis to avoid unstable sensing near the threshold level. A preferred use for the telltale is in apprising a motor vehicle operator when to turn on the vehicle headlamps.

7 Claims, 8 Drawing Sheets

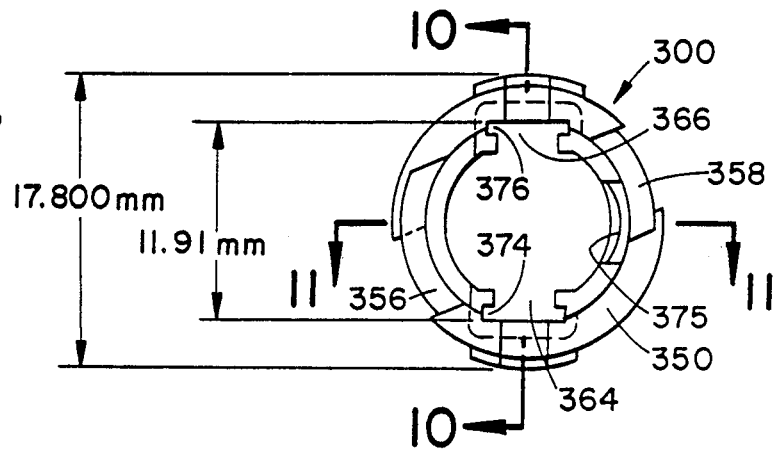
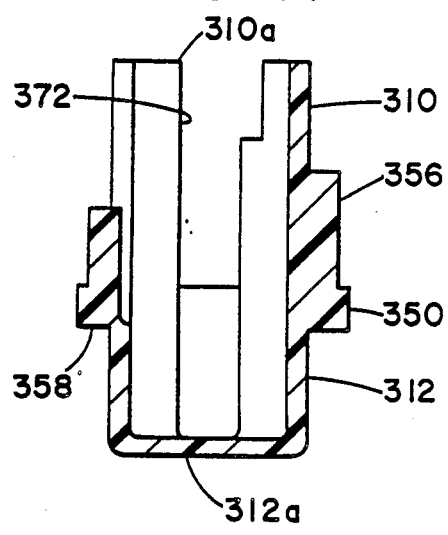
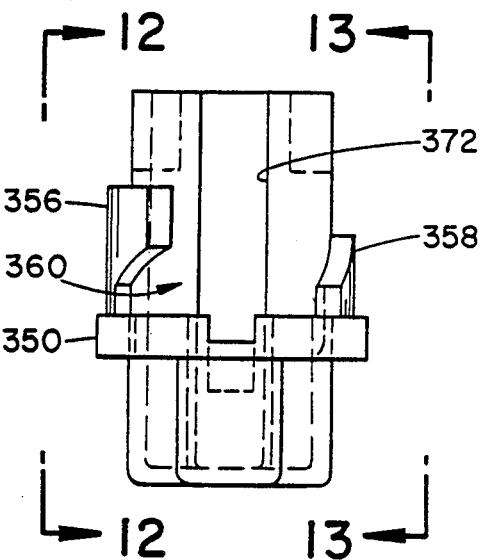
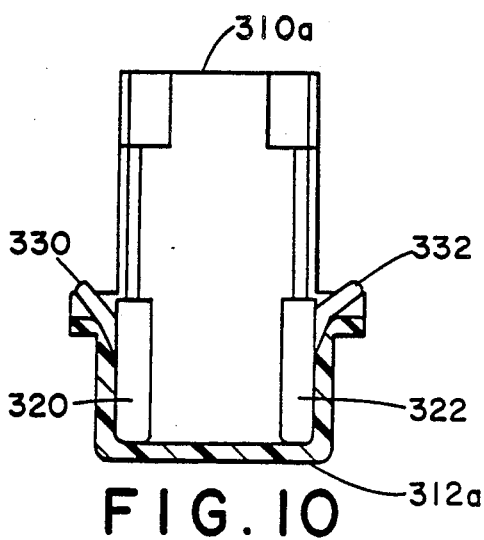
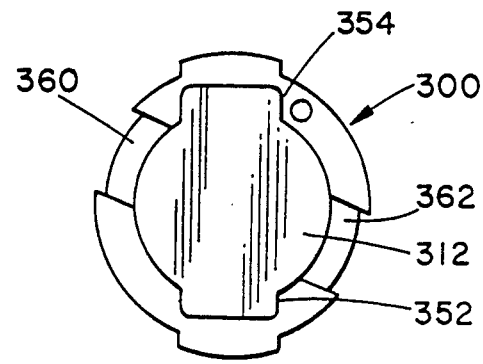

AMBIENT LIGHT SENSING METHOD AND APPARATUS

TECHNICAL FIELD

The present invention relates to an ambient light sensor and a control system for responding to ambient light levels.

BACKGROUND ART

Photodiodes have in the past been utilized for a number of applications wherein light levels are sensed and a current output produced directly related to the ambient light. One example of a prior art system is an ambient light sensor for sensing the approach of an oncoming motor vehicle and automatically dimming a high beam headlamp to eliminate the need for motor vehicle operator actuation of a dimmer switch. Another representative use of a photodiode is for sensing light levels in an optical character recognition system where reflected light from a document is scanned by a character reader which converts the reflected signal from the paper to a digital signal corresponding to the characters on the document.

DISCLOSURE OF THE INVENTION

The present invention relates to a system that responds to ambient light levels by providing a control output to activate a controlled device. One use of the invention includes a telltale and means for energizing the telltale to provide a warning when ambient light levels have fallen below a threshold. Other embodiments of the invention automatically activate a controlled element such as a relay or a motor.

In accordance with a preferred use of the ambient light sensor, when an ambient light level falls below the threshold value, the telltale flashes on and off to provide a visual indication that the ambient light level is below the threshold. The light sensor and telltale are integrally packaged in a small compact housing. is below the threshold. The light sensor and telltale are integrally packaged in a small compact housing. During the off periods of the flashing telltale, the sensor monitors ambient light level so if the ambient light increases, the telltale is de-activated.

A preferred use of the invention is in a motor vehicle and in particular is a telltale mounted to the vehicle dashboard to indicate to the motor vehicle operator that the ambient light level has fallen below a threshold level indicating the vehicle headlamps should be turned on.

Certain automobiles are now equipped with headlamp circuits that are turned on at reduced power levels at all times. Unless the motorist activates a headlamp switch, however, the taillights are not turned on, nor are the headlamps operating at full power. The half power headlamp energization may mislead the motorist and the present telltale activation technique will provide a warning that the headlamps should be turned on as ambient light levels fall.

In one embodiment of the invention, a time delay is built into a telltale triggering circuit so that the telltale is activated only if the ambient light is below a threshold for a specified time period. If, for example, the vehicle passes beneath a large tree that creates enough shade to cause the ambient level to fall below the threshold, the telltale is not falsely triggered since the car presumably will pass out from under the tree after a time period less than the triggering delay time.

In an alternate embodiment of the invention a telltale energization circuit turns off the telltale at a different light level than it turns the telltale on. This hysteresis avoids false triggering of the telltale at ambient light levels near the threshold level.

In another embodiment of the invention, the circuit is partially enclosed in an assembly comprising a housing supported by a base. The preferred assembly has a ridge which separates the base and housing and a channel which passes through the ridge and which is constructed and arranged to position and lock the assembly into a socket in a vehicle instrument cluster module. Contacts in the assembly with tabs reaching through the assembly to engage the ignition and park lamp inputs conduct energy to the circuit.

From the above it is appreciated that one object of the invention is a combined ambient light sensor and warning system packaged in a compact assembly that utilizes a control triggering circuit which flashes a telltale on and off so that during off periods of the telltale, the sensor can monitor ambient light levels. This and other objects, advantages and features of the invention will become better understood from a detailed description of a preferred embodiment of the invention which is described in conjunction with the accompanying drawings.

BRIEF DESCRIPTION OF THE DRAWINGS

FIG. 7 is a top plan view of a housing of the ambient light sensor constructed in accordance with the invention;

FIG. 8 is an elevation view of the FIG. 7 housing;

FIG. 9 is a bottom plan view of the FIG. 7 housing;

FIG. 10 is a cutaway elevation view of the FIG. 7 housing showing the electrical contacts;

FIG. 11 is a cutaway elevation view of the FIG. 7 housing rotated 90° from FIG. 10;

BEST MODE FOR CARRYING OUT THE INVENTION

Figure 1:
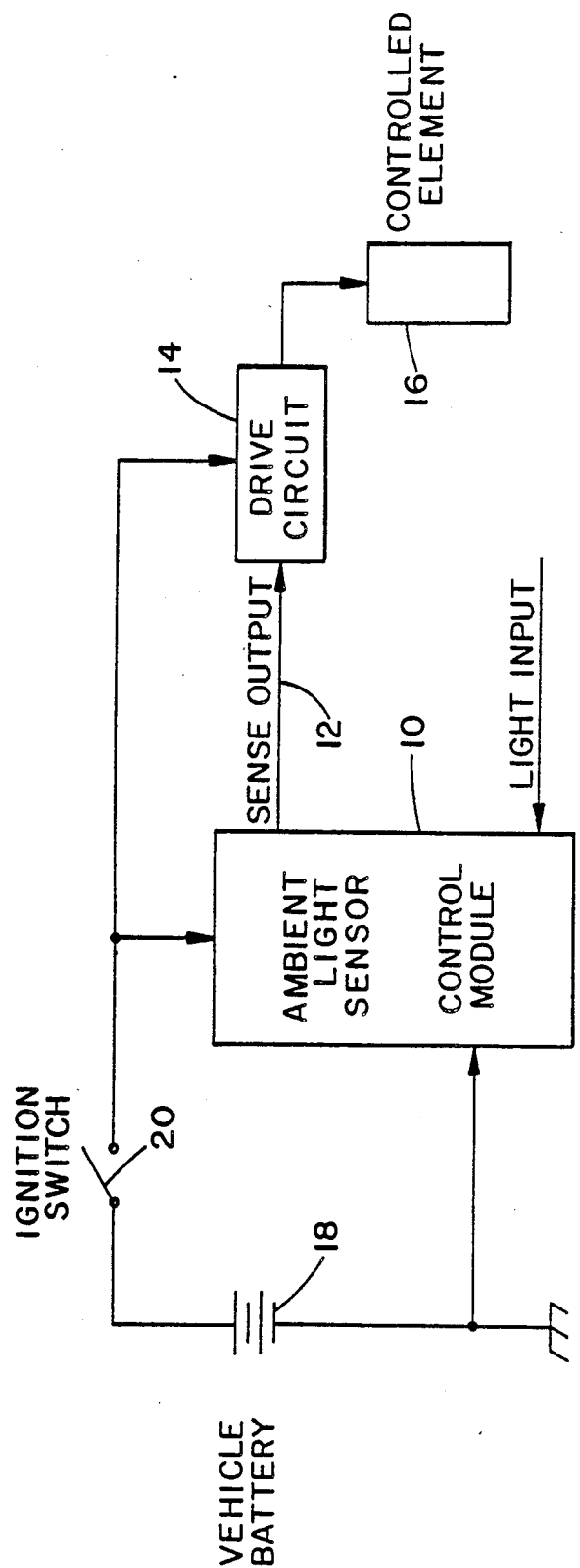
FIG. 1 is a schematic of an ambient light sensor for use with a motor vehicle and a circuit for producing a controlled output from the ambient light sensor.

Turning now to the drawings, FIG. 1 is a schematic showing a motor vehicle use of a light sensor 10. The sensor 10 monitors a light level in the vicinity of the sensor and produces a controlled output 12 to a drive circuit 14 for energizing a controlled element 16. The controlled element might, for example, comprise a headlamp dimmer switch for activating high and low beam headlamps. The motor vehicle battery 18 is utilized to energize the light sensor 10. The light sensor 10 depicted in FIG. 1 is active only when an ignition switch 20 has been closed by the vehicle operator. The ignition switch 20 applies energization signals to both the ambient sensor 10 and the drive circuit 14.

The ambient light sensor 10 monitors ambient levels and responds to a threshold ambient light by activating the drive circuit. Although as seen below, a preferred control system responds to low light levels to activate a warning, the ambient light sensor 10 can also respond to high ambient light levels to activate the drive circuit. In the preferred embodiment, the controlled element 16 comprises a telltale or warning lamp which flashes on and off to apprise a motor vehicle operator to turn on the vehicle headlamps. In alternate designs, however, the controlled element 16 might comprise a vehicle sunroof, heater, or headlamp.

Figure 2:
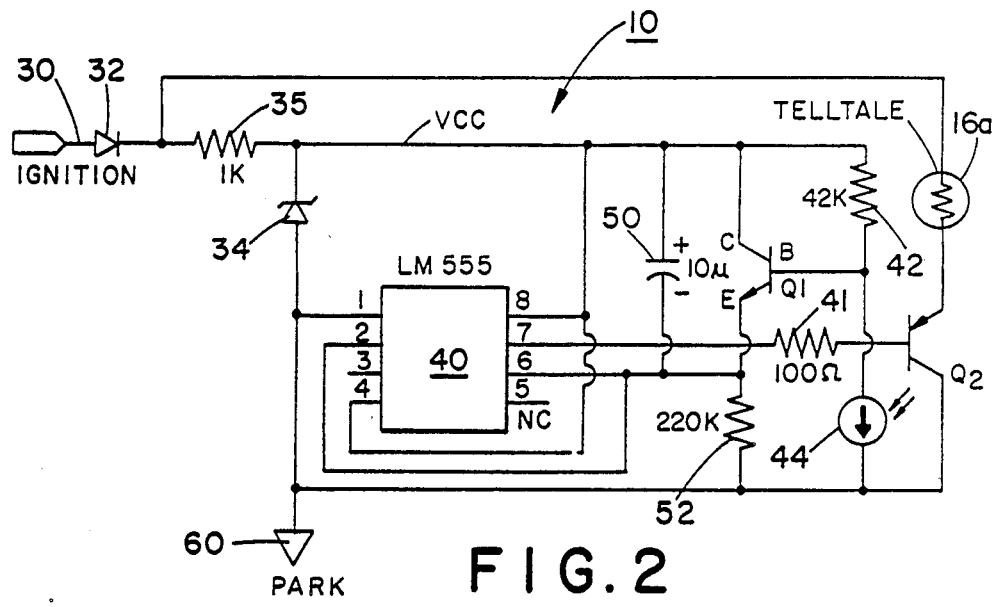
FIG. 2 is a detailed schematic of one embodiment of a telltale system for flashing a light on and off in response to sensed ambient light level.

Turning now to FIG. 2, an ambient light sensor and telltale circuit 10 is energized by an ignition input 30 coupled to the ignition switch 20 (FIG. 1). A diode 32 prevents negative transients from reaching the ambient light sensing circuit 10. A regulated voltage of approximately 6.8 volts is produced by a zener diode 34. Current through the circuit 10 is regulated by an input resistor 35.

A telltale or warning light 16a is coupled to the regulated input from the ignition 30 and in particular is series connected to a transistor Q2 having its emitter coupled to a park light circuit connection 60. If the vehicle park lights and headlamps are off, this input 60 is grounded through the off resistance of the lamp. Otherwise, the connection 60 is at the vehicle battery voltage. When a base input to the transistor Q2 biases the transistor into conduction the transistor energizes the telltale 16a. The base input to the transistor Q2 is coupled to pin 7 of a timing circuit 40 through a 100 ohm resistor 41.

Figure 3:
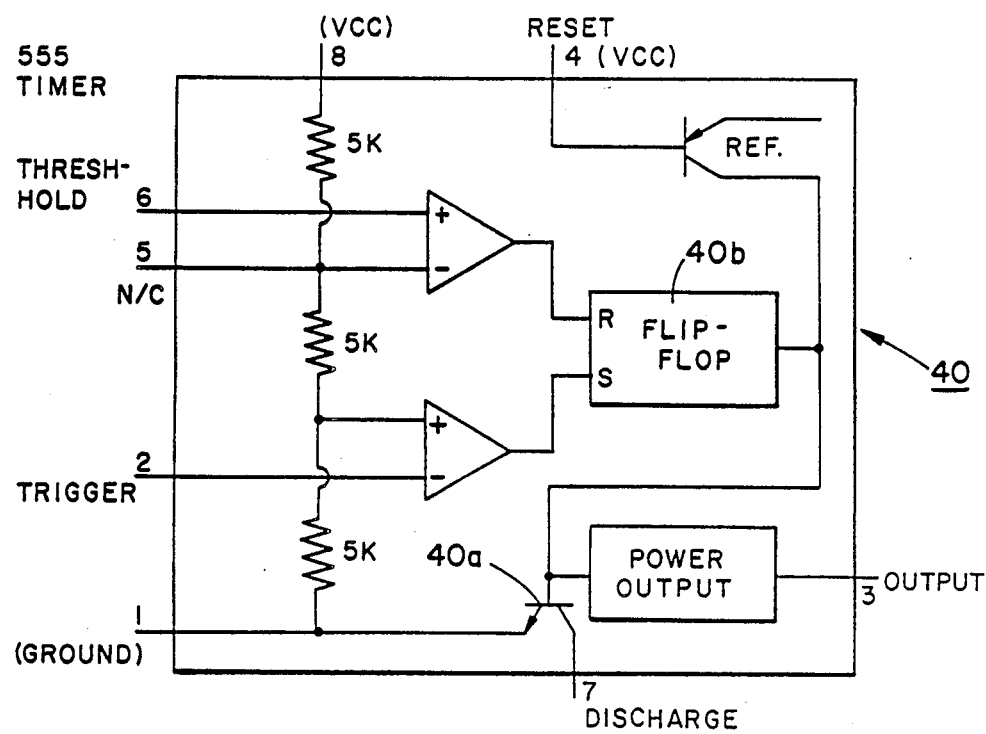
FIG. 3 is a schematic of a prior art timing circuit.

A preferred timing circuit 40 comprises a 555 timer schematically depicted in FIG. 3. By referring to that schematic, it is seen that pin 7 is coupled to a collector junction of an internal transistor 40a. A base input to this internal transistor 40a is controlled by a RS flip-flop 40b having two inputs connected to the outputs of two comparator amplifier circuits. Two comparator circuit inputs are coupled to a voltage divider which defines reference inputs of $\frac{2}{3}$ VCC and $\frac{1}{3}$ VCC respectively. Trigger and threshold inputs to the two comparators are coupled pins 2 and 6 of the FIG. 2 timing circuit.

Returning to FIG. 2, the regulated voltage VCC controlled by the zener diode 34 is coupled across the series combination of a resistor 42 and a photodiode 44. Ambient light impinging upon the photodiode 44 controls the current through the resistor 42 and diode 44, thereby controlling the voltage at a base photo input to an emitter-follower transistor Q1. The transistor emitter E is connected to the trigger and threshold pins (2,6) of the timer 40. At high ambient light levels current through the photodiode 44 is high. This keeps the base voltage of the transistor Q1 low and therefore maintains the emitter voltage at pins 6 and 2 below a trigger voltage of $\frac{1}{3}$ VCC. As ambient light level decreases a threshold voltage is reached as the transistor emitter voltage reaches $\frac{2}{3}$ VCC.

As seen by reference to FIG. 3, when the input at pin 6 reaches $\frac{2}{3}$ VCC the trigger input is, of course, greater than $\frac{1}{3}$ VCC and the internal comparator of the timer 40 generates a high output that resets the internal flip-flop 40b to turn on the internal transistor 40a causing pin 7 to be grounded. The low output at pin 7 turns on a drive transistor Q2 activating the telltale or light bulb 16a.

The transistor Q2 remains turned on until the output from the timer 40 at pin 7 is open circuited. When the telltale 16a turns on it emits light causing current through the photodiode 44 to increase. This lowers the base voltage of the transistor Q1 and drops the emitter voltage below a trigger voltage of $\frac{1}{3}$ VCC. The voltage at pin 2 does not immediately fall to this level, however, due to the delay imposed by the combination of a capacitor 50 and resistor 52.

The capacitor 50 is coupled across the collector to emitter junction of the transistor Q1. The voltage across the capacitor 50 varies as the emitter voltage follows the base input. When the emitter voltage drops in response to activation of the telltale 16a, the charged capacitor 50 resists this drop and begins to discharge through the resistor 52 with a time constant of approximately 5 seconds. It takes approximately this delay period of 5 seconds for the voltage at pin 2 (trigger input) to reach the value of $\frac{1}{3}$ VCC. When this happens, pin 7 of the timer 40 opens and the transistor Q2 turns off. The telltale 16a stops emitting light and the current through the photodiode 44 drops to a level corresponding to the ambient light level. As noted above, if this current level causes the base input to the transistor Q1 to exceed the threshold value of $\frac{2}{3}$ VCC the telltale 16a again turns on. If the current is high enough to maintain the base input below this threshold level, the telltale 16a is not energized.

The circuit of FIG. 2 operates in two distinct modes depending on ambient light levels. When the ambient light level is below the threshold level, the telltale 16a flashes on and off indicating the ambient light level has fallen below this threshold. When the ambient light level exceeds the threshold, the telltale remains de-energized until the ambient light level falls below the threshold.

It is the intent that the motor vehicle operator will turn on the vehicle headlamps when the telltale flashes on and off. A circuit ground 60 is not coupled to vehicle ground but is instead coupled to a park lamp circuit signal. When the headlamps are on, this signal goes high and both the timer circuit 40 and the drive transistor Q2 are de-activated until the operator switches off the headlamps.

Figure 4:
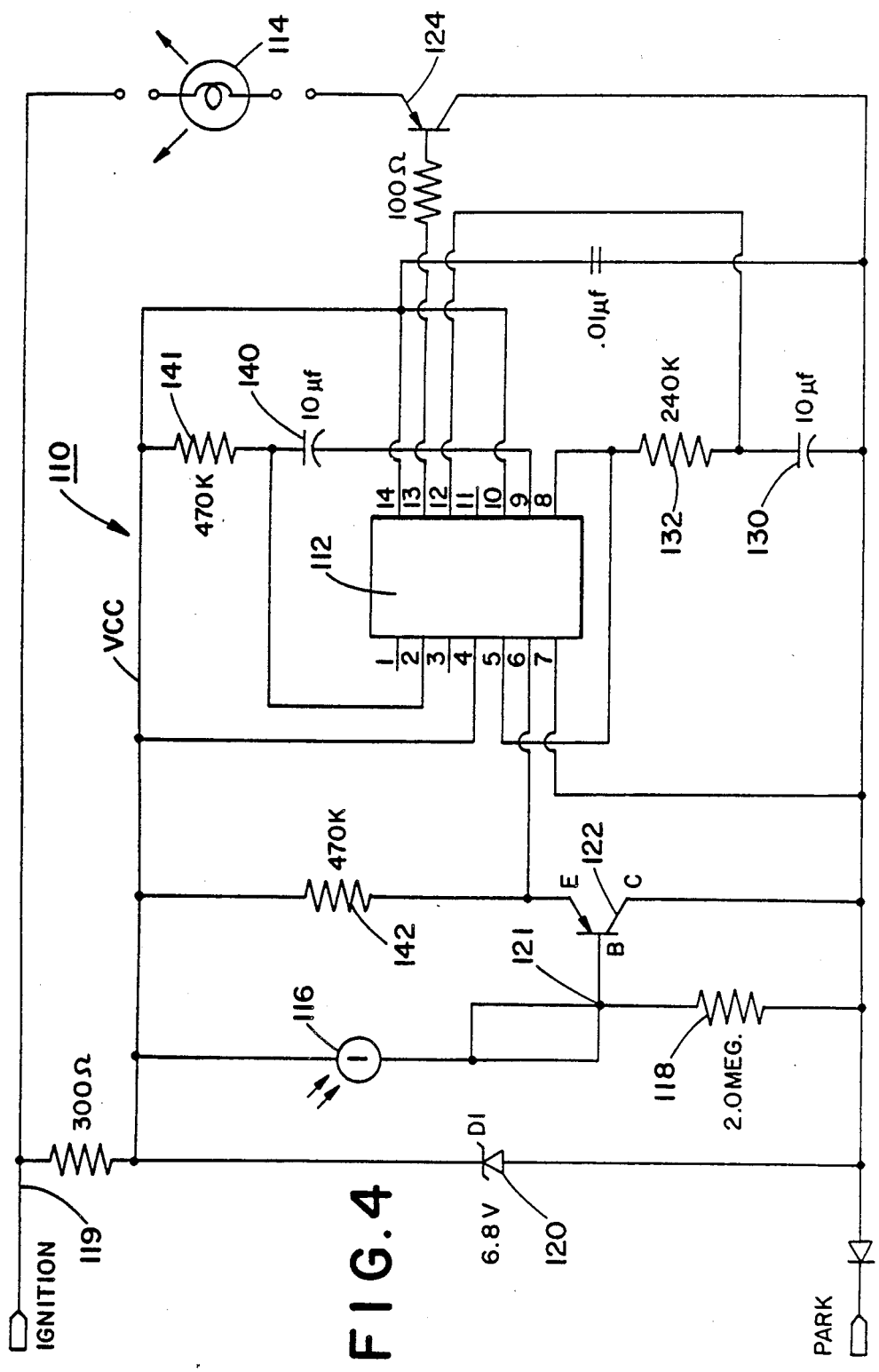
FIG. 4 is a schematic of an alternate ambient light control having a time delay.

Turning now to FIG. 4, a preferred activation circuit 110 is depicted that utilizes a commercial 556 timer circuit 112 rather than the 555 timer circuit of FIG. 2. The 556 timer 112 includes two internal circuits similar to the circuit depicted in FIG. 3. Generally, pins 1–7 on one side of the 556 timer correspond to a first timer unit and pins 8–14 correspond to a second unit.

Table I below summarizes the inputs to the 556 timer.

TABLE I

| PIN | DESCRIPTION | |
| --- | --- | --- |
| 1 | Discharge | 1 |
| 2 | Threshold | 1 |
| 3 | Control Voltage | 1 |
| 4 | Reset | 1 |
| 5 | Output | 1 |
| 6 | Trigger | 1 |
| 7 | Ground | |
| 8 | Trigger | 2 |
| 9 | Output | 2 |
| 10 | Reset | 2 |
| 11 | Control Voltage | 2 |
| 12 | Threshold | 2 |
| 13 | Discharge | 2 |
| 14 | VCC | |

Time Delay Operation

The activation circuit 110 of FIG. 4 delays telltale activation to avoid false energization of the telltale or bulb 114 unless a sensor 116 perceives the ambient light level to be below a threshold value for greater than a delay time period T. The ambient light level can temporarily fall below this threshold if, for example, the vehicle passes beneath a shadow from a tree or the like. To avoid false triggering during this temporary situation, the circuit 110 does not initially energize the bulb 114 unless the ambient threshold level is experienced for a time greater than the time period T.

The sensor 116 comprises a photodiode and current amplifier whose current changes based upon the ambient light level. The sensor 116 is series coupled to a resistor 118 and energized by a voltage provided by a suitable input circuit. In the embodiment depicted in FIG. 4, an ignition input 119 is regulated by a regulating zener diode 120 to provide a VCC signal. A junction 121 between the sensor 116 and resistor 118 is coupled to the base of a transistor 122 whose emitter is connected to pin 6 of the timer 112. The transistor 122 is configured as a follower circuit so that the voltage at pin 6 follows the voltage at the junction 121 between the sensor 116 and resistor 118.

Under daylight conditions, the voltage at the junction 121 and thus at pin 6 of the timer is greater than ⅓ VCC (the ⅓ VCC trigger voltage) so the control output at pin 5 is low. With pin 5 low, pin 8 (trigger 2) of the timer 112 is also low and the discharge output at pin 13 of the timer is open. Pin 13 is coupled to a base input of a transistor 124 that energizes the bulb 114. With the base of a transistor 122 open, the bulb or telltale 114 is de-energized. Under daylight conditions pin 9 is high and therefore a junction between a capacitor 140 and resistor 141 is also high. This junction is coupled to pin 2 (threshold 1) of the timer 112 and keeps pin 5 output high.

As the ambient light level decreases, the voltage at the junction 121 and therefore the trigger input at pin 6 falls below ⅓ VCC. This causes the power output from the timer at pin 5 to go high, causing the trigger input at pin 8 to also go high. As the output at pin 5 turns on, a capacitor 130 charges through a resistor 132 with a time constant based on the sizes of the capacitor and resistor. The voltage on the capacitor 130 is coupled to pin 12 which is the threshold input to the second timer circuit. The time delay experienced before the voltage at the capacitor 130 rises above ⅔ VCC is what causes the circuit 110 to avoid false triggering unless the ambient light level remains at a threshold level for a period of time. If, for example, the ambient light increases and the voltage at pins 2 and 6 rises above ⅓ VCC before the voltage on the capacitor 130 reaches ⅔ VCC, output pin 5 again goes low causing the capacitor 130 to discharge so the voltage at pin 12 never reaches the threshold level to ground pin 13.

In a preferred embodiment, the resistor capacitive time constant of the resistor 132 and capacitor 130 is approximately 4 seconds. When the sensor 116 experiences a threshold ambient light level for this time period, input pin 8 is greater than ⅓ VCC and input pin 12 is greater than ⅔ VCC. These two input conditions cause pin 13 to be grounded, turning on the transistor 122 and energizing the telltale 114 or bulb. This also causes the output at timer pin 9 to go low.

Once the bulb 114 is energized, the sensor 116 senses a "daylight" condition causing current through the sensor 116 to rise which causes the base input to the transistor 121 to increase. When pin 9 goes low, however, this signal is coupled to pin 2 so that the voltage on pin 2 is less than ⅔ VCC. With pin 2 less than ⅔ VCC, pin 5 will remain high regardless of the input at pin 6. Thus the tell tale stays on even though the sensor 116 sees "daylight".

After more than five seconds the capacitor 140 charges and the voltage at pin 2 rises above ⅔ VCC causing the output at pin 5 to go low. This low output is then transmitted to the trigger input at pin 8 to open pin 13 and turn off the telltale 114. The bulb 114 therefore remains energized for more than 5 seconds and is then de-energized so that the sensor 116 again monitors ambient conditions. If the ambient conditions are still "dark" when the telltale is de-energized the voltage at the emitter of the transistor 121 will immediately fall below ⅓ VCC causing the output at pin 5 to go high. The capacitor 130 has not been discharged so that the "off" period for the bulb 114 is less than the on period once an initial dark condition has been sensed and there is no time delay to avoid triggering on a false "dark" condition.

If in response to the flashing of the telltale or light bulb 114, the vehicle operator activates the vehicle headlamps, a park light input to the circuit 110 goes high and the circuit 112 is deactivated. Thus, once the operator responds to the flashing of the telltale 114 by turning on the headlamps the bulb stops flashing.

Hysteresis Embodiment

Figure 5:
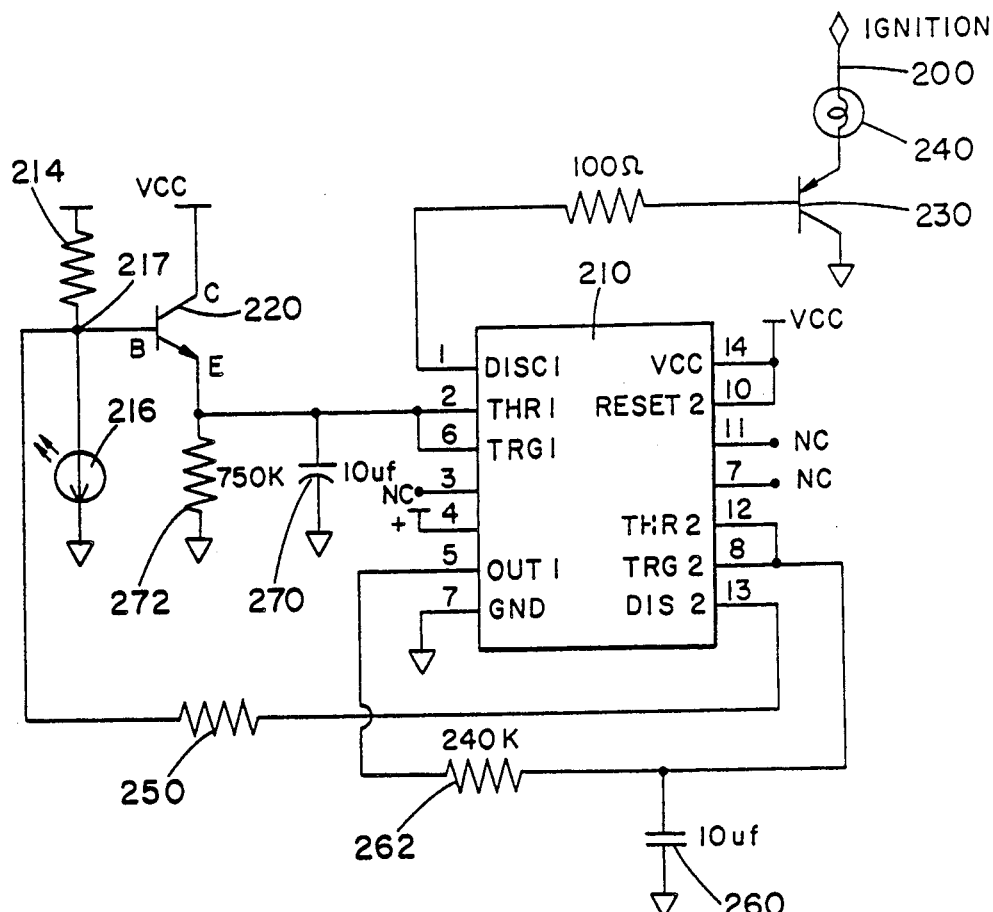
FIG. 5 is a schematic of a third ambient light control having a hysteresis.

FIG. 5 illustrates a third embodiment of the invention. This embodiment utilizes a hysteresis effect to avoid cycling on and off of the warning lamp at ambient light levels near a threshold level.

Figure 5A:
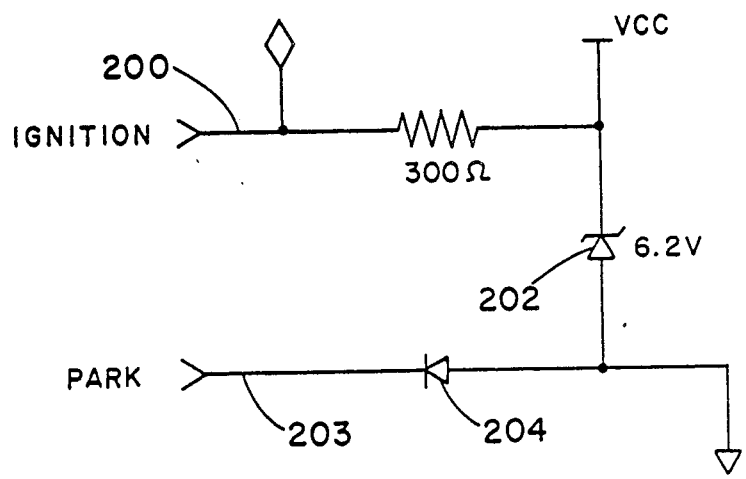
FIG. 5A is schematic of ignition and park light input to the FIG. 5 schematic.

The FIG. 5 circuit is also energized by a motor vehicle ignition input 200 regulated by a zener diode 202 coupled to a park light input 203 through a diode 204 (see FIG. 5A). Coupled between the energizing voltage VCC and ground are a resistor 214 and a photosensor 216. A junction 217 between the resistor 212 and photosensor 216 is coupled to a base input of a transistor 220 configured as an emitter follower. The emitter output from the transistor 220 is coupled to pins 2 and 6 of a 556 timer circuit 210. Under daylight conditions, the emitter from the transistor 220 is low (less than ⅓ VCC) and output pin 5 from the timer 210 goes high. A discharge output at pin 1 is opened so that a drive transistor 230 coupled to the bulb 240 is deactivated.

Output pin 5 is also coupled to the trigger and threshold inputs at pins 8 and 12 of the timer 210. With these two inputs high, the second discharge output at pin 13 is grounded so that a resistance 250 is coupled in parallel to the sensor 216. This drops the voltage at the junction 217 between the resistor 214 and the sensor 216. Under these conditions, the voltage at the base input to the transistor 220 is lower than it would be absent the presence of the resistor 250. As it becomes darker, the resistance of the sensor 216 increases but due to the presence of the resistor 250, must increase a greater amount to pull the emitter output from the transistor 220 up to the point where the threshold input changes state (i.e., rises above ⅔ VCC). When this "darker" condition is achieved, the voltage at pins 2 and 6 causes the output at pin 1 to be grounded, turning on the transistor 230 and energizing the bulb 240.

The turning on of the light bulb 240 also coincides with a change in output pin 5. Pin 5 goes low causing a capacitor 260 to discharge through a resistor 262. As the capacitor voltage goes low, the threshold and trigger inputs to the second timer at pins 8 and 12 go low causing the discharge output at pin 13 to be open circuited. When this occurs, the resistor 250 is no longer grounded so that the ambient light level needed to energize the bulb 240 is adjusted. Once the "darker" condition has been initially satisfied the condition for energizing the bulb 240 becomes less, so that only a "dark" condition is necessary.

Once the bulb 240 is energized, a "daylight" condition is sensed and the base input to the transistor 220 goes low. This reverse biases the transistor base to emitter junction but does not immediately lower the voltage at the input pins 2 and 6 due to the presence of a capacitor 270 coupled to the transistor emitter. When the transistor 220 is reversed biased the capacitor 270 discharges through a resistor 272 with a time constant of approximately 5 seconds. After the 5 second delay, the capacitor 270 has discharged to approximately ⅓ VCC to cause pin 1 of the timer 210 to open. This de-energizes the bulb 240 and causes pin 5 to go high. When pin 5 goes high, the capacitor 260 begins charging but the output at pin 13 is still open circuited. Therefore it becomes easier for the sensor 216 to sense a "dark" condition to again activate the light bulb 240. If this dark condition is sensed, the bulb 240 is immediately energized for a subsequent 5 seconds, warning the motor vehicle operator that the ambient conditions require headlamp activation. If the dark condition is not satisfied, i.e., the ambient light condition is above this dark state, the capacitor 260 will discharge through the resistor 262 causing the threshold and trigger inputs at pins 8 and 12 to change state, grounding the discharge output at pin 13 and again requiring a "darker" condition for bulb activation.

Figure 6:
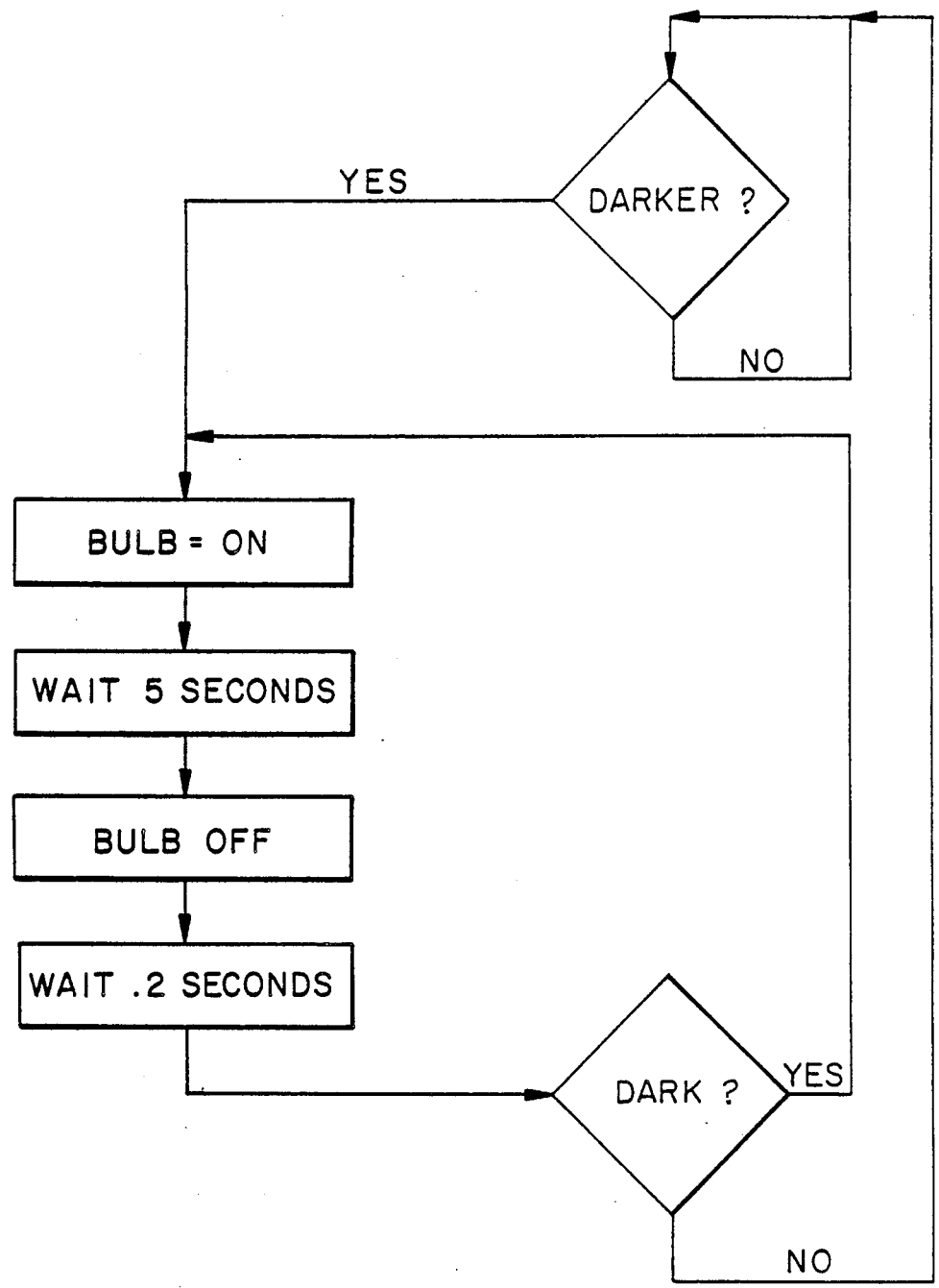
FIG. 6 is a flow chart of the hysteresis operation of the FIG. 5 circuit.
Figure 15:
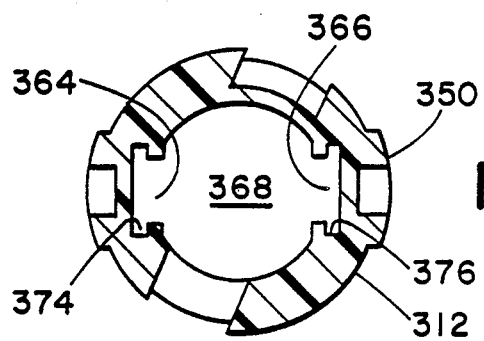
FIG. 15 is a sectional view of the FIG. 7 housing taken through the ridge 350.
Figure 16:
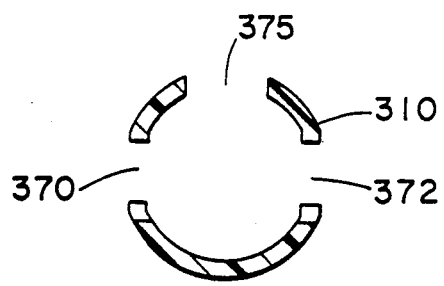
FIG. 16 is a sectional view of the FIG. 7 housing taken through the housing.
Figure 14:
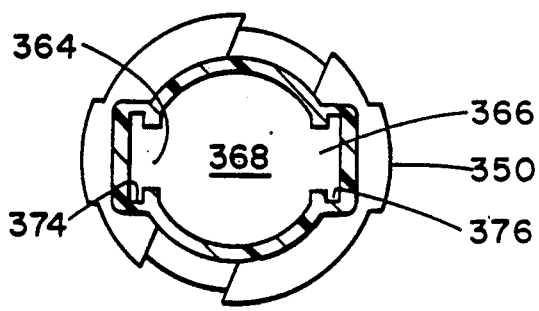
FIG. 14 is a sectional view of the FIG. 7 housing taken through the base.
Figure 13:
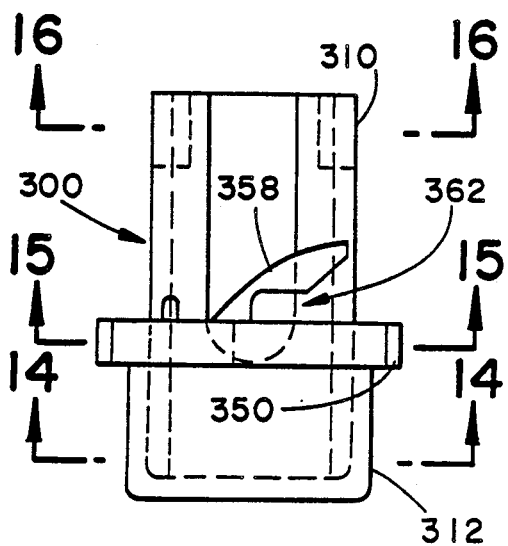
FIG. 13 is an elevation view of the FIG. 7 housing rotated 180° from FIG. 12.
Figure 12:
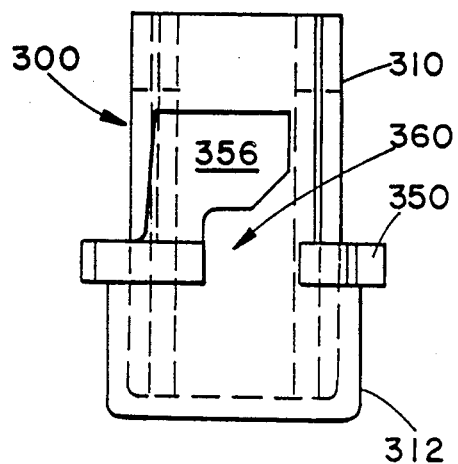
FIG. 12 is, an elevation view of the FIG. 7 housing rotated 90° from FIG. 8.

FIG. 6 depicts a flow chart summarizing operation of the circuit depicted in FIG. 5. Once the darker condition is satisfied the sensing circuit only requires that the ambient conditions be "dark" for the bulb to cycle on and off at 5 second increments. This arrangement avoids unstable operation near the "darker" ambient light level since once the "darker" condition is reached, only the "dark" condition needs to be sensed to keep the bulb 240 flashing. As in the FIG. 4 embodiment, the ground voltage is coupled to the park input 203 so that once the motor vehicle operator activates the headlamps, the sensing circuit is deactivated and the bulb 240 is no longer energized.

Sensor Housing

Figure 17:
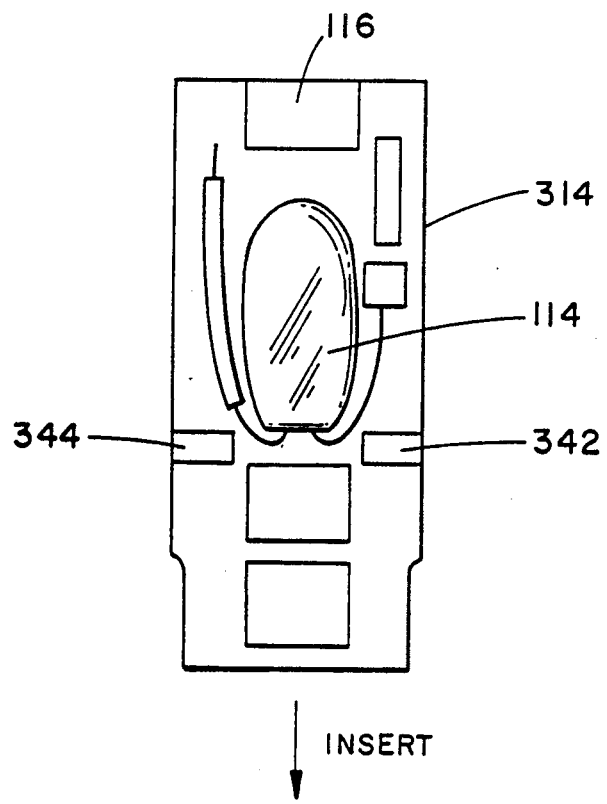
FIG. 17 is a schematic diagram showing the arrangement of electrical components on one side of the printed circuit board.

FIGS. 7-16 depict a lamp assembly 300 for the bulb or telltale and monitoring circuits discussed previously. A bulb housing 310 is supported by a base 312. The housing 310 and the base 312 are molded as one part. A printed circuit board 314 (FIG. 17) that supports the timer circuit (555 or 556) (not shown) is connected to the base 312 and oriented generally at right angles to a base surface 312a. Mounted to the printed circuit board 314 is a photosensor 116 for monitoring ambient light levels.

In the preferred embodiment, the lamp assembly 300 is approximately cylindrical and composed of an opaque plastic. The housing 310 and base 312 are separated by a ridge or rim 350. The interior of the housing 310 and base 312 are hollow, leading to a closed base surface 312a.

At opposite sides of the base 312, two printed circuit board receiving channels 364, 366 extend out from the generally cylindrical blind opening 368 in the base 312 into a pair of ribs 352, 354. A pair of slots 370, 372 through the housing 310 communicate with the printed circuit board receiving channels 364, 366 to receive the printed circuit board 314.

At opposite sides of the housing 310, a pair of locking fingers 356, 358 cooperate with the ridge 350 to define a pair of channels 360, 362 which pass through the ridge 350.

A pair of metal conductors are lodged in a pair of recesses 374, 376 in the base 312. Two contacts 320, 322 extend up from the conductors into the opening 368 to hold the printed circuit board inside the assembly 300. A pair of tabs 330, 332 are positioned to engage the ignition and park lamp inputs (shown schematically in FIG. 2) and conduct power through the contacts 320, 322 into a pair of printed circuit board inputs 342, 344.

When fully assembled, the printed circuit board 314 is pressed through the opening 310a in the housing 310 and down into the slots 370, 372 and printed circuit board receiving channels 364, 366. A slot 375 accommodates the photosensor 116, which protrudes from the printed circuit board 314.

The contacts 320, 322 frictionally engage the printed circuit board 314 over the printed circuit board inputs 342, 344. Ambient light is admitted through the opening 310a to act on the photosensor 116 and light from the light bulb 114 illuminates the photosensor 116 when it is energized.

Figure 18:
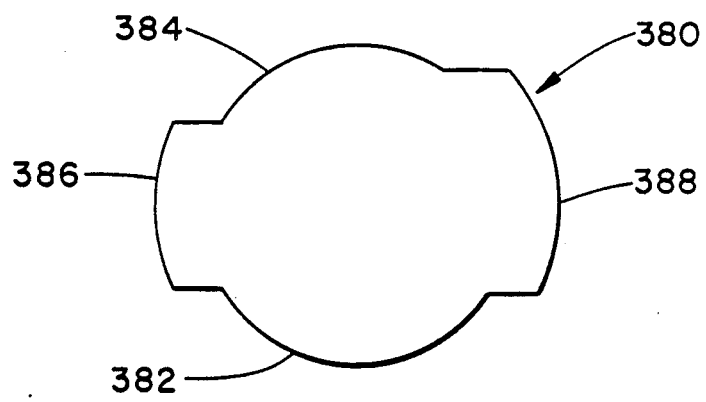
FIG. 18 is a schematic diagram showing the profile of the vehicle instrument cluster module socket for receiving the assembly.

The assembly 300 is pushed through a socket 380 in a vehicle instrument cluster module (not shown) so that the opening 310 faces the driver. The profile of the socket 380 is shown in FIG. 18. The channels 360, 362 engage the narrowed portions 382, 384 of the socket 380 so that, when the assembly 300 is pushed into the socket 380 and rotated, the narrowed portions are locked between the ridge 350 and the locking fingers 356, 358. In this position, the tabs 330, 332 engage the ignition and park lamp inputs which energize the circuit.

One of the wider portions 386, 388 of the socket 380 is longer circumferentially than the other so as to orient the tabs 330, 332 into engagement with the proper inputs from the instrument cluster module.

The present invention has been described with a degree of particularity. It is the intent, however, that the invention include all modifications and/or alterations falling within the spirit or scope of the appended claims.

I claim:

1. Sensing apparatus for use in a motor vehicle comprising:
   energization means for providing an energization signal;
   sensor means for monitoring an ambient light level and producing a sensed signal related to said ambient light level;
   a timer coupled to the sensor means for generating an indicating output in response to a sensed signal corresponding to a threshold ambient light level; and
   a light source energized by the energization signal and coupled to the timer to respond to the indicating output if the ambient light level sensed by the sensor means reaches the threshold ambient light level;
   said timer responsive to said sensor means to energize said light source for a first time period and then de-energize said light source to allow the sensor means to sense ambient light levels without interference from the light output from the source.

2. The apparatus of claim 1 where the sensor means comprises a photodiode sensor which converts light levels to electrical current.

3. The apparatus of claim 1 wherein the sensing means and light source are mounted in a housing which is at least partly light transmissive.

4. The apparatus of claim 1 where the triggering means comprises delay means for delaying production of the indicating output for a delay period to avoid activation of the controlled means in response to short period low ambient light level condition.

5. A method for warning a motorist regarding ambient light conditions comprising the steps of:
   mounting a light sensor and telltale warning light source in a common housing removably mounted to a vehicle instrument cluster in visual proximity to the motorist;
   energizing the light sensor from a vehicle ignition and sensing ambient light conditions;
   when the light conditions fall below a threshold level, activating the light source for a predetermined on time;
   subsequent to said on time turning off the light source and again sensing ambient light conditions with the light source off to determine if the threshold ambient level still exists; and
   continuing the steps of alternately activating the light source, turning off the light source and sensing ambient conditions until the ambient level rises above a reference level, the motorist turns off the vehicle ignition, or the motorist turns on the vehicle headlights.

6. The method of claim 5 wherein a time delay is imposed between the sensing of the threshold level and the turning on of the light bulb source.

7. The method of claim 5 where the reference level of the continuing step is greater than the threshold level to avoid cycling on and off of the light source at ambient light levels near the threshold level.

* * * * *